United States Patent [19]

Neward

[11] 3,890,420
[45] June 17, 1975

[54] METHOD OF MAKING A BIPOLAR ELECTRODE STRUCTURE

[76] Inventor: Theodore C. Neward, 521 Scripps, Claremont, Calif. 91711

[22] Filed: June 4, 1973

[21] Appl. No.: 366,701

[52] U.S. Cl. .............. 264/261; 264/272; 264/275; 264/278
[51] Int. Cl. ............................................. B29f 1/10
[58] Field of Search .......... 264/272, 275, 276, 277, 264/279, 274, 278, 261; 249/83, 91; 425/468

[56] References Cited
UNITED STATES PATENTS

| | | | |
|---|---|---|---|
| 3,045,290 | 7/1962 | Anderson et al. | 264/272 |
| 3,298,087 | 1/1967 | Hunt | 264/272 |
| 3,444,618 | 5/1969 | Sorlie | 264/272 |

Primary Examiner—Robert F. White
Assistant Examiner—T. E. Balhoff
Attorney, Agent, or Firm—Lyon and Lyon

[57] ABSTRACT

An improved bipolar electrode structure is formed by the process of injection molding a suitable plastic or the like into one or more cavities of a mold. Conductors are electrically connected to a spring and wafer electrode comprising the bipolar electrode structure. The spring electrode is positioned in its cavity and a predetermined surface area thereof is wound around a spindle which is in turn inserted into an orifice in the mold to allow the remaining portion of the spring electrode to be encapsulated by the plastic or the like upon injection molding. Further, the corresponding wafer electrode is also positioned partly in the same cavity of the mold to allow for the encapsulation of all but a predetermined surface area of the wafer electrode by the plastic or the like upon injection molding.

3 Claims, 10 Drawing Figures

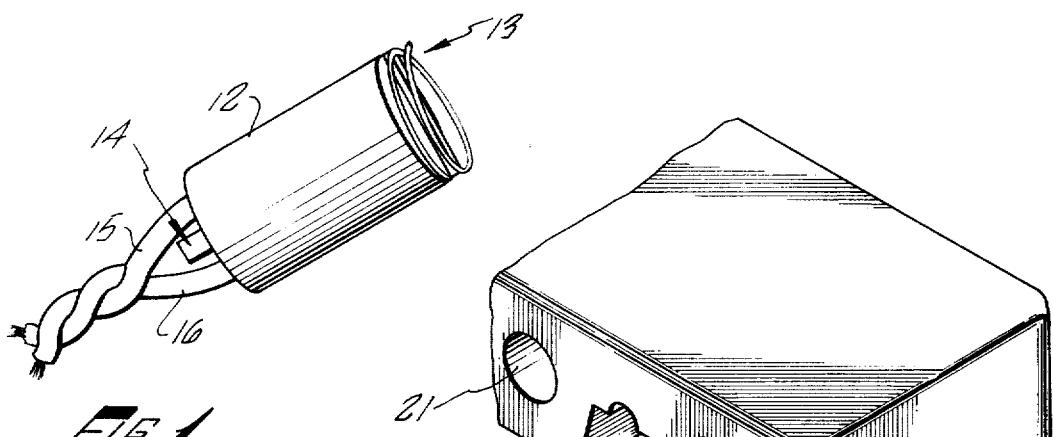
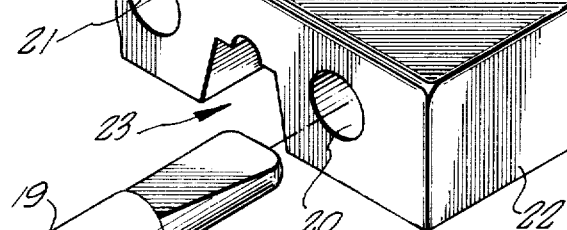
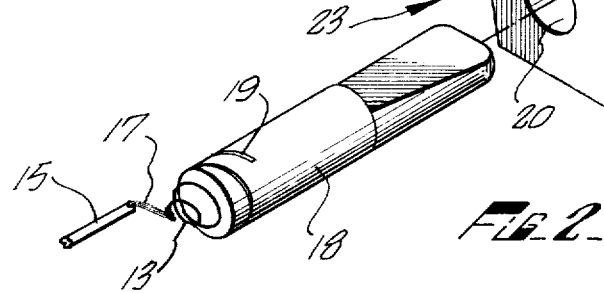
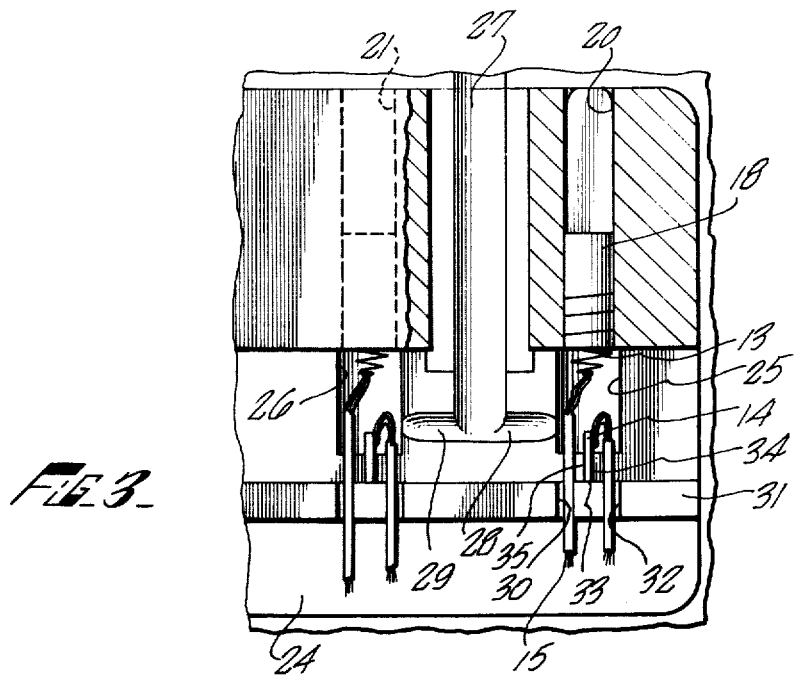
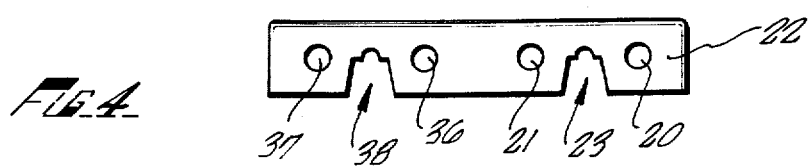

METHOD OF MAKING A BIPOLAR ELECTRODE STRUCTURE

BACKGROUND OF THE INVENTION

The present invention relates to a method of making a bipolar electrode structure suitable for use in fetal heartbeat monitoring.

More particularly, the present invention relates to a method of making a bipolar electrode structure which may be inserted through the vagina and cervix of a woman in labor into contact with a fetal epidermis area. The bipolar electrode structure may be then electrically connected to an amplifier and a cardiotachometer or the like, for recording the fetal electrocardiogram and heartrate during labor and delivery.

Typically, bipolar electrode structures, suitable for fetal heartbeat monitoring were individually handmade by epoxy pouring techniques. Epoxy poured bipolar electrodes structures were tedious to produce and difficult to make without including air pockets or the like in the structure. These air pockets or non-homogeneous regions resulted in noise problems when used to sense fetal heartbeats.

The bipolar electrode structure in operation provides a path for current, from the monitored fetus to the recording equipment, with a magnitude in the milliamps. Because of the small magnitude of current involved in recording the fetal heartbeat, and the dangers involved to the mother and the fetus, if faulty signals are recorded, the elimination of sources of noise interference is of the utmost importance.

The noise interference problem has been substantially overcome by making a bipolar electrode structure through injection molding techniques. A material suitable for such a process is a low density polyethylene injected into a cavity or cavities of a mold using a pressure of approximately 20,000 pounds per square inch.

A further prior art difficulty of making suitable bipolar electrode structures is the criticality of the exposed surface area ratio between the spring electrode and the wafer electrode. It has been determined that the exposed surface area of the wafer electrode is preferably twice that of the exposed surface area of the spring electrode. If this surface area ratio is substantially varied, the signal to noise ratio of the system becomes a significant inhibiting factor in the monitoring operation. Thus, care must be exercised in making by hand bipolar electrode structures to achieve a suitable exposed surface area electrode ratio.

This prior art difficulty has been substantially overcome by positioning the spring electrode in a cavity and winding or wrapping a predetermined surface area of the spring electrode on a spindle or the like and inserting the spindle into an orifice in a mold to allow for an encapsulation of all but the predetermined surface area of the spring electrode in the cavity by the plastic or the like upon injection molding. Likewise, the corresponding wafer electrode is also positioned partly in the same cavity of the mold to allow for the encapsulation of all but a predetermined surface area of the wafer electrode by the plastic or the like upon injection molding. In addition, this injection molding method has the further advantage of lending itself to mass production techniques without sacrifice in the quality of the bipolar electrode structures.

The bipolar electrode structures typically comprises a first conductor having a spring electrode electrically attached or formed at one end thereof. The wafer electrode is likewise electrically attached or formed at one end of a second conductor by means similar to that utilized with a spring electrode. The conductors ending in the spring and wafer electrodes form a bipolar electrode structure after the electrodes are properly positioned in a cavity and subjected to a suitable plastic upon injection molding. The formed bipolar electrode structure includes the exposed predetermined surface areas of the spring electrode, typically in the form of a spring or screw, and the wafer electrode typically in the form of a parallelepiped. The exposed portion of the wafer electrode is initially mounted in corresponding slots in a driving tube. The slots in the driving tube are typically designed to form a relatively loose drive connection so that the driving tube will slip around the wafer electrode and thus not drive the bipolar electrode structure towards the fetus when the wafer electrode meets with a relatively slight amount of resistance of rotation. Thus, when the spring electrode has pierced the fetal epidermis and the forward end of the bipolar electrode structure has come into contact with the fetus, any continued rotation of the driving tube will not drive the spring electrode further into the fetus. This loose connection may be accomplished by making the material of the driving tube or that segment adjacent the bipolar electrode structure soft or pliable so that slippage will occur when the bipolar electrode structure resists rotation.

The driving tube containing the bipolar electrode structure at its forward end is typically inserted through a guide tube for insertion into the mother's vagina and cervix until the forward end of the guide tube makes contact with the fetal head (or other portion of the fetus). The doctor then, while holding the forward end of the guide tube stationary, pushes the rear end of the driving tube forward until the spring electrode makes contact with the fetal epidermis. An indicator mark may be provided on the driving tube to visually warn the doctor when the spring electrode has passed beyond the forward end of the guide tube.

When the doctor feels or sees that the spring electrode has contacted the fetal epidermis, the doctor rotates the driving tube a predetermined amount while maintaining the guide tube against the fetal head. This screws the spring electrode into the fetal epidermis thus making a proper electrical contact.

Typically, the doctor would try to turn the driving tube by grasping the same at the forward end using the fingers on one hand, while holding the guide tube stationary with the other hand. This procedure was awkward and unsure since the guide tube and the driving tube are typically of a relatively small diameter and are made of a relatively smooth plastic in order to permit sliding and rotation between the tubes. This procedure was further aggravated by the difficulty of acquiring a sure one-handed grip by a doctor wearing surgical gloves.

A further prior art difficulty occured because of the relative sliding movement between the first and second conductor and the driving tube. During the insertion of the guide tube and the driving tube, and especially during the relative rotation of the driving tube inside the guide tube, it was desirable to prevent the conductors internal to the driving tube from gaining slack or play. If play resulted, the bipolar electrode could disengage from its mounted position on the forward end of the driving tube while inside the mother and require the removal and reinsertion of the guide tube, the driving tube, and the bipolar electrode.

The prior art solution to these problems resulted in the insertion of a wedge in the rear end of the driving tube to prevent relative sliding movement between the driving tube and the conductors. This necessitated an additional step at relatively critical movement (such as when the driving tube is rotated in the guide tube to screw the spring electrode into the fetal epidermis) and the possibility of the wedge becoming dislodged was always present.

After the spring electrode was properly secured, the wedge at the end of the driving tube was removed, the doctor typically grasped both the driving tube and the guide tube and extracted them from the mother leaving only the first and second conductors attached to the secured bipolar electrode structure. Thus, only relatively thin conductors and the bipolar electrode were within the mother during labor. The outer ends of the conductors were then connected to suitable apparatus (not shown) for monitoring fetal heartbeat.

The foregoing problems have likewise been substantially eliminated by providing in a preferred embodiment an integrally molded clip having a head portion and a collar portion. The collar portion having an inside diameter suitable for the frictional engagement of the rear end of the driving tube. The head portion having a first and second ear portion, each ear portion having an aperture therethrough and including a rough gripping edge. The first and second ear portion being connected by a flexible member which when flexed to a first position provides for an alignment of the respective aperture, and in a second position provides for the gripping of any conductors passed through the apertures.

SUMMARY OF THE INVENTION

It is therefore an object of this invention to make a bipolar electrode structure suitable for fetal heartbeat monitoring by the process of injection molding.

It is a further object of this invention to form an improved bipolar electrode structure having a predetermined ratio of exposed electrode surface by the process of injection molding.

It is a further object of this invention to form through injection molding an improved bipolar electrode structure which includes the steps of winding a first electrode on a spindle and inserting the spindle in a mold orifice to allow the exposure of a predetermined surface area of the first electrode.

It is also an object of this invention to provide an integrally molded releasable clip to provide sure one-handed operation of a driving tube.

It is a still further object of this invention to provide an integrally molded clip. It is still a further object of this invention to provide a molded clip which is formed to frictionally engage a driving tube and thus control the penetration of a bipolar electrode structure in a forward and reverse direction.

It is a further object of this invention to provide a releasable clip capable of the conductors utilized in a driving tube to provide sufficient tension on the conductors.

Briefly stated and in accordance with an embodiment of this invention, an improved method of forming a bipolar electrode structure suitable for monitoring fetal heartbeat is provided by affixing a first and second electrode to a first and second conductor and winding a predetermined surface area of the first electrode around a spindle which is in turn inserted into an orifice in a mold.

A portion of the second electrode is positioned in a cavity in the mold with the corresponding remaining portion of the first electrode to result in a predetermined surface area of the second electrode being outside the cavity. The cavity upon injection molding receives a plastic or the like and a bipolar electrode structure is formed.

Further, an integrally molded releasable clip is provided which grasps the conductors at the second end to prevent unwanted slacking of the conductors and rotate and drive the driving tube.

BRIEF DESCRIPTION OF THE DRAWINGS

The invention both as to its organization and principle of operation, together with further objects and advantages thereof, may better be understood by reference to the following detailed description of an embodiment of the invention when taken in conjunction with the accompanying drawing in which:

FIG. 1 is a perspective view of a bipolar electrode structure in accordance with the method of this invention.

FIG. 2 is a perspective view of a spindle and an orifice in a mold section in accordance with the method of this invention.

FIG. 3 is a top section view of the bottom plate of a mold suitable for injection molding which includes two cavities, each of which includes bipolar electrodes and conductors in accordance with the method of this invention.

FIG. 4 is a front view of a mold section with four orifices, each adapted to receive a spindle in accordance with the method of this invention.

DETAILED DESCRIPTION OF THE PREFERRED EMBODIMENT

Figure 5:
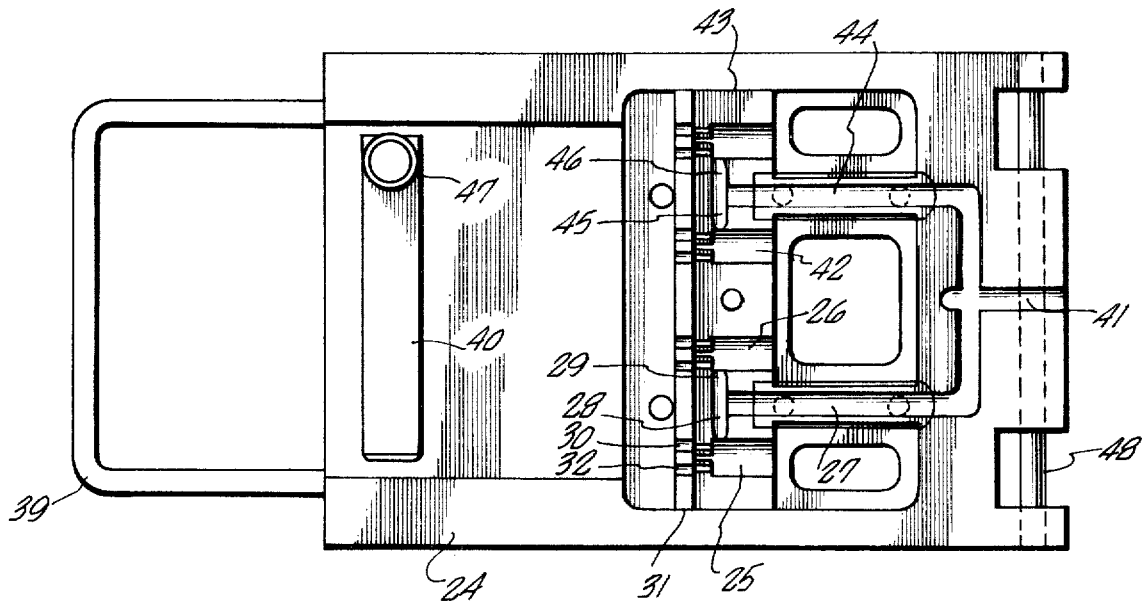
FIG. 5 is a top view of the bottom plate of a mold suitable for injection molding and in which a plurality of bipolar electrode structures may be made in accordance with the method of this invention.

Referring now to FIG. 1, there is illustrated a bipolar electrode structure 11 formed by an injection molding process utilizing a plastic such as a low density polyethylene under a pressure of approximately 20,000 lbs. per square inch. The bipolar electrode structure includes a polyethylene body 12 having a first spring or electrode 13 at the forward end thereof and a second or wafer electrode 14 at the rear end thereof. The first and second electrodes are made of a conductive metal such as stainless steel or the like. The exposed surface area of the wafer electrode 14 is approximately twice the exposed surface area of the spring electrode 13. Leading into the rear end of the body 12 of the bipolar electrode structure 11 are a first wire or conductor 15 and a second wire or conductor 16. Conductors 15 and 16 at their first ends are electrically connected in the body 12 of the bipolar electrode 11 to the spring electrode 13 and the wafer electrode 14 respectively. The second end of the conductors 15 and 16 are connected in a manner well known in the art to monitoring equipment (not shown) suitable for monitoring fetal heartbeat, heartrate or the like.

FIG. 2 illustrates the first conductor 15 electrically connected or attached to the spring electrode 13 by suitable means such as a solder and flux composition 17. Solder and flux composition 17 is illustrative only and any suitable electrical connection or the spring electrode 13 being an extension of the conductive portion of the conductor 15 is contemplated.

The electrode 13 is wrapped or wound around a first end of a spindle 18. The spindle 18 may include a groove 19 which provides a path or guide for the winding of the spring electrode 13. The groove 19 may further assure that the spring electrode 13 is only wound a predetermined distance on the spindle 18. The groove 19 may be internal or external to the spindle 18, the criteria being that a predetermined surface area of the spring electrode 13 be exposed from the body 12 after the injection molding process is completed. This is accomplished by inserting the spindle 18 with the predetermined amount of spring electrode 13 wound thereon and inserting the spindle 18 into an orifice in a mold such as orifices 20 or 21 in a mold section 22. When the spindle 18 is inserted in the orifice 20 of mold section 22, the electrode section wound on the spindle 18 is not subject to encapsulation by the polypropylene or the like during injection molding. The second end of the spindle 18 forms a wedged incline to facilitate easy alignment with an internal stud in the mold section 22 as is better illustrated in FIG. 7.

The mold section 22 further includes an aperture 23 between orifices 20 and 21 to provide an upper portion of a pathway for the material which is injection molded to form the body 12 of the bipolar electrode structure 11.

FIG. 3 illustrates the bottom section 24 of a mold suitable for injection molding which includes the bottom sections of chambers or cavities 25 and 26, respectively. A bottom section of a pathway 27 forms bottom sections of subpassageway 28 into cavity 25 and of subpassageway 29 into cavity 26. It is to be noted that the location of the subpassageways 28 and 29 as shows in important in minimizing movement of the conductor 15 during encapsulation. This location is near the wafer electrode 14 rather than near the spring electrode 13 (otherwise, the conductor 15 will tend to move or bow toward the side of the cavity 25 and not become fully encapsulated because of the force of the plastic material entering the cavity 25 during injection molding). Also, the conductor 15 is connected to the centered end of the spring electrode 13 as shown, and this arrangement further minimizes movement of the conductor 15 during incapsulation.

Illustrated internally in cavity 25 is the forward or first end of the first conductor 15 aligned and positioned in a first alignment slot 30 of a wall 31. The conductor 15, at its first end, has a bared portion electrically connected to the spring electrode 13 which has been wound around the spindle 18 prior to its insertion into orifice 20.

The second conducor 16 is likewise, at its first end, inserted into the cavity 25 alignment and positioned in a second alignment slot 32 in wall 31. Internal to the cavity 25 is a bared portion of second conductor 16 electrically connected to the wafer electrode 14. The wafer electrode 14 is also aligned and positioned in a third alignment slot 33 between wall sections 34 and 35 to position only a predetermined surface area of the wafer electrode 14 outside of the cavity 25 so that a wafer electrode 14 in cavity 25 will be encapsulated by the polyethylene or the like, after injection molding has occurred.

Once the body 12 of the bipolar electrode structure 11, is formed by the completed injection molding process, the spindle, such as spindle 18 is extracted from the orifice 20 of the bottom section 24 of the mold and the spring electrode 13 is unwound from the spindle 18 and removed.

The structure and operation of the spindle in orifice 21 and the bipolar electrode in cavity 20 is believed to be evident from the above description.

In FIG. 4, the mold section 22 is illustrated to include four separate orifices 20, 21, 36 and 37, each of which are adapted to receive a spindle as previously described. The shape of the orifices and their cooperating spindles are illustrated as being generally cylindrical but any cooperating shapes are contemplated by this invention. Pathways 23 and 38, are provided to form the top portion of the pathways used in the injection molding process to form a plurality of bodies 12 of the bipolar electrode structures.

FIG. 5 is the bottom section 24 of a four orifice mold structure including a lower handle 39 and an alignment spring 40 secured to the top of the bottom section 24 of the mold by a retaining means or bolt 47. The alignment spring 40 is utilized to aid in the alignment of the conductors to position them in the proper orientation in the respective cavities 25, 26, 42 and 43. Main passageway 41 branches into passageways 27 and 44 and ultimately, once the mold section 22 with its apertures 23 and 38 is inserted, into subpassageways 28 and 29, 45 and 46 to provide a proper pathways for the body material into cavities 25, 26, 42 and 43.

The bottom section 24 of the mold also includes the wall 31 which includes the first and second alignment slots 30 and 32 and corresponding alignment slots for corresponding cavities 26, and 42 and 43 which function in the manner previously described.

Finally, in referring to FIG. 5 there is illustrated an axle 48 which is used as a pivot for the hinge means on the top section of the mold.

Figure 6:
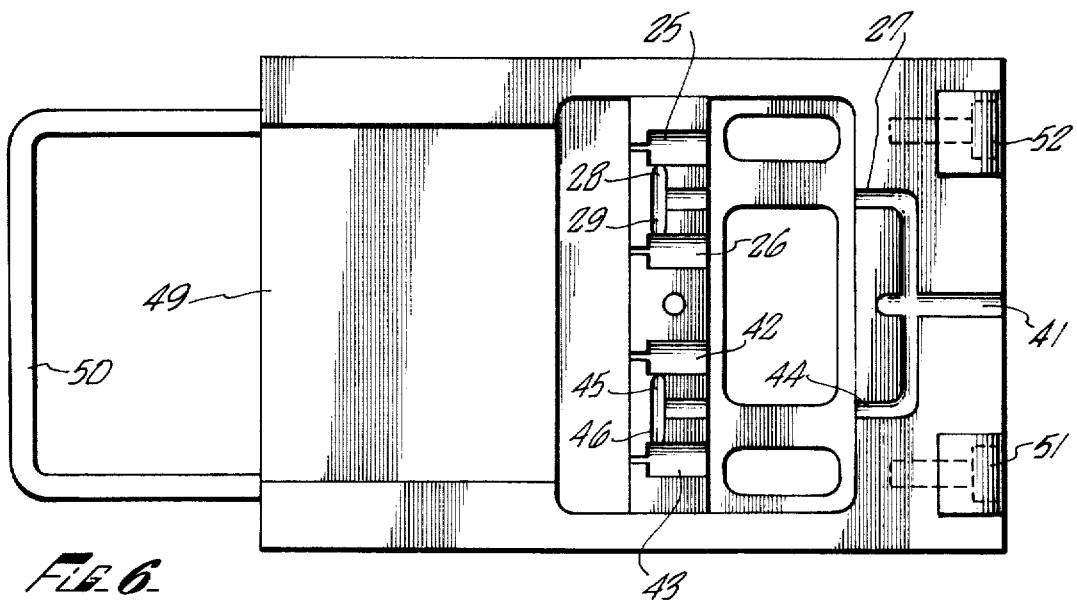
FIG. 6 is a bottom view of the top plate of a mold suitable for injection molding and in which a plurality of bipolar electrode structure may be made in accordance with the method of this invention.

FIG. 6 illustrates the top section 49 of the mold having an upper handle 50 and hinges 51 and 52. Hinges 51 and 52 are adapted to engage the axle 48, to provide for the joining of the top and bottom sections 49 and 24 to provide a path for the material used in the injection molding process to fully encapsulate the portions of the conductors 14 and 15, and electrodes 13 and 14 located in the cavities 25, 26, 42 and 43.

The top section 49 of the mold includes the corresponding upper passageways of main passageway 41, passageway 27, 44 and subpassageways 28, 29, 45 and 46.

Figure 7:
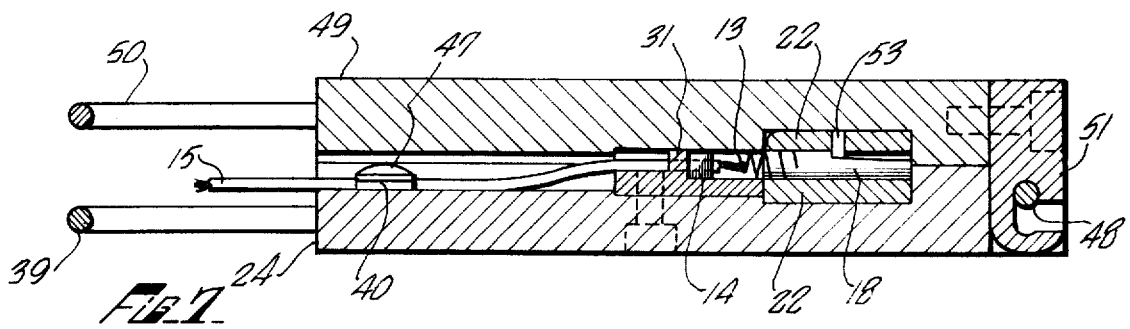
FIG. 7 is a side view in cross section of the top and bottom plates of a mold in a closed position illustrating the position of the components of a bipolar electrode prior to the body being formed thereon by the process of injection molding all in accordance with the method of this invention.

FIG. 7 illustrates the mold in a closed position in which the top section 49 and the bottom section 24 provides the proper pathways for the injection molding process. At the left-end of the mold are upper handle 50 and lower handle 39, and at the right end of the mold are axle 48 engaged in a closed position by hinge 51.

In FIG. 7, top section 49 and bottom section 24 of the mold are illustrated in their closed position as is indicated by axle 48 and hinge 51 as well as by a segment of upper handle 50 and lower handle 39.

The first conductor 15 is illustrated as being secured under the alignment spring 40 which is secured to the bottom section 24 by a bolt 47. The conductor 15 travels inside the mold through the first alignment slot of wall 31 and pass the wafer electrode 14 to the spring electrode 13 which in turn is wound around the spindle 18. The spindle 18 is inserted in its orifice 20 in mold section 22. The spindle 18 has a tapered forward end which cooperates with a stud or screw 53 to provide for proper alignment of the spindle 18 in the orifice 20. The body 12 of bipolar electrode structure 11 is formed when the mold is in the configuration of FIG. 7 by an injection molding process introducing an appropriate plastic or the like through passageway 41.

Figure 8:
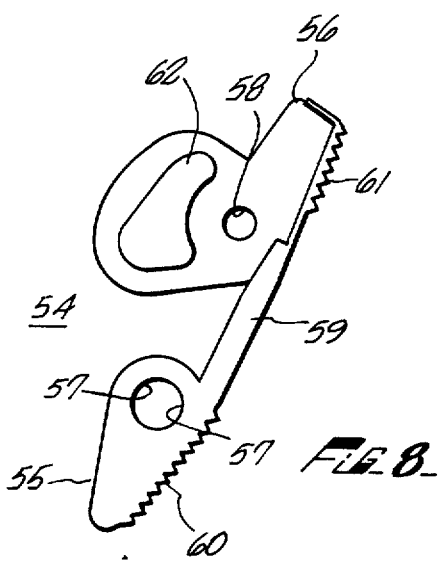
FIG. 8 is a top view of a clip in its fully relaxed position in accordance with this invention.

FIG. 8 illustrates a head portion 54 of an integrally molded, one-piece assembly. The head portion 54 comprises a first ear portion 55 having a first aperture or pathway 57 located therein and a second ear portion 56 having a second aperture 58 located therein. First ear portion 55 is integrally connected to the second ear portion 56 by means of a flexible arm 59. An outer or gripping edge 60 and 61 of the first and second ear portion respectively are provided with grooves serrations or a general roughening to aid in the use of the clip as previously described. The second ear portion 56 includes an integrally formed elbow or stop 62 which allows he first ear portion 55 to be engaged therein when in a first or relaxed position as shown in FIG. 9.

Figure 9:
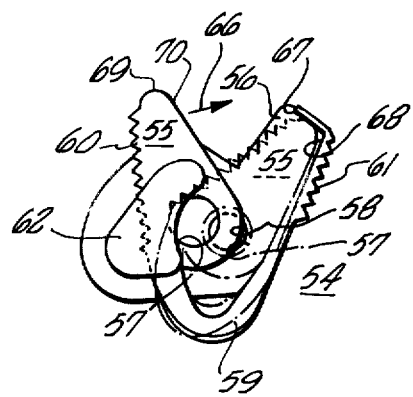
FIG. 9 is a top view of a clip in a first and second position in accordance with this invention.

FIG. 9 illustrates the head portion 54 in its relaxed position and in its second or flexed position. First ear portion is positioned under the top portion of stop 62 in its relaxed position. First ear portion 55 is illustrated as being positioned over a surface of the second ear portion 56 in the clips second position.

In operation, the conductor 15 and 16 are positioned through a collar of the clip and second aperture 58 of the second ear portion 56 and the first aperture 57 of the first ear portion 55 when the clip is in its flexed position. The flexed position is accomplished by gripping the outer surface of gripping surfaces 60, and 61, respectively, of the first and second ear portions and squeezing or urging them together thereby flexing flexable arm 59 and providing substantial alignment of first and second apertures 57 and 58.

When the grip is relaxed from the gripping surface 60 and 61, the flexible arm 59 urges the ear portions apart and the first ear portion 55 is never allowed to relax beyond a side member of stop 62. This relaxed position will grip or hold the conductors 15 and 16 in a manner to provide for a sufficient force to urge the bipolar electrode structure 11 to remain in its grooves or slots or a driving tube as previously described.

Figure 10:
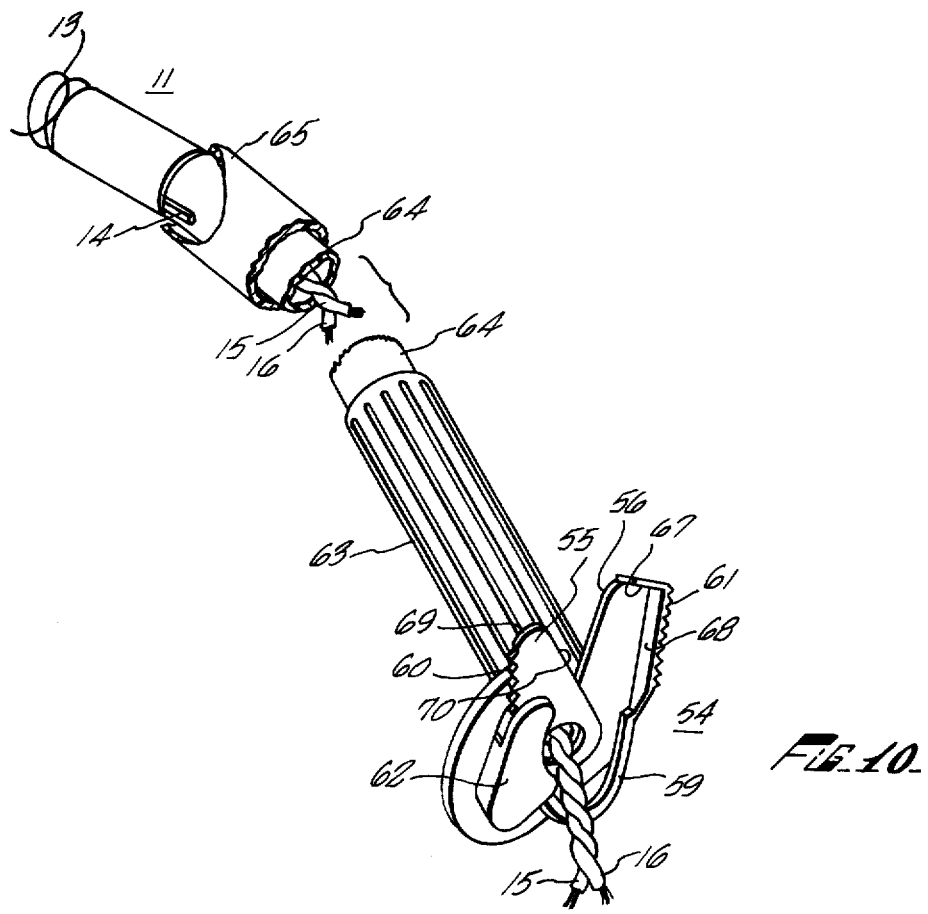
FIG. 10 is a perspective view of a clip in accordance with this invention.

FIG. 10 illustrates the clip including the previously described head portion 54 and an attached elongated tubular collar 63 which is formed integral therewith. The head portion 54 is illustrated to be in its relaxed position, that is, engaging the first and second conductors 15 and 16 which are passed through the respective apertures of second ear portion 56 and the first ear portion 55 to provide a sufficient gripping or holding force on the conductors to assure a prevention of relative slippage between the conductors 15, 16 and a driving tube 64. The first ear portion 55 is illustrated as being positioned by allowing the flexible arm 59 to substantially relax, but still desired to approach its fully opened position as in FIG. 8. In any event, the side member of stop 62 will prevent the head portion 54 from returning to the position of FIG. 8.

The elongated tubular collar or neck portion 63 includes an inner diameter which provides a frictional engagement with the surface of the driving tube 64 to provide control of the rotational and longitudinal movement thereof. An internal ridge member is optionally provided in the interior of the collar portion 63 to act as a stop for the driving tube 64 at a predetermined depth.

As has been previously described, the driving tube 64 includes at its furthest end, slots or the like in which the wafer electrode 14 may be mounted, thereby aligning the bipolar electrode structure 11 in the proper position. A guide tube 65 is provided to perform the functions previously described.

The clip is preferably made of a low density polyethylene using an injection molding technique with an approximate pressure of 20,000 lbs. per square inch. The clip has the advantages previously described and provides for the control of the relative sliding between the conductors and the driving tube in an improved way while also being relatively easy to manufacture and mass produce.

When the clip is further compressed as indicated by arrow 66 in FIG. 9, the two aperture or holes 57 and 58 become exactly aligned to prevent any drag on the conductors 15 and 16 as the tubes 64 and 65 are removed from the conductors 15 and 16. A stop for accomplishing this alignment is provided by faces 67 and 68 of ear portion 56 being contacted by edges 69 and 70 of ear portion 55.

While embodiment and application of this invention has been shown and described it will be apparent to those skilled in the art that many more modifications will be possible without departing from the inventive concepts herein described.

What is claimed and desired to be secured by Letters Patent is:

1. A method of making an electrode structure including a helically coiled sharpened prong electrode and a conductor, the electrode and conductor having attached portions, the method characterized by:
   a. screwing the helically coiled electrode into a helical groove in a spindle to secure the electrode thereto;
   b. placing the spindle into a recess confronting a mold cavity to effect insolation of the coiled electrode from the mold cavity;
   c. positioning the attached portions of the electrodes and conductor in the mold cavity;
   d. extending the remaining of the conductor through an opening communicating with the mold cavity to isolate the remaining portion of the conductor from the mold cavity; and e. injecting a mold material into the mold cavity to form a part encompassing the attached portions of the electrode and conductor.

2. A method as defined in claim 1, further characterized by:

a. extracting the encompassing part and spindle simultaneously; and
   b. and unscrewing the spindle from the helically coiled electrode.

3. A method of making a cylindrical electrode structure having a helically coiled prong electrode at one end and at its opposite end, a second axially extending electrode, and corresponding conductors; the coiled electrode and axial electrode and their corresponding conductors having attached portions, the method characterized by:

a. screwing the coiled electrode into a helical groove in a spindle to secure the coiled electrode thereto;
   b. inserting the spindle into a recess confronting a mold cavity to effect isolation of the coiled electrode from the mold cavity;
   c. positioning the axial electrode in a slot at the opposite end of the mold cavity;
   d. positioning the conductors in conforming slots leading from the mold cavity;
   e. positioning the respective attached portions of the coiled electrode and its conductor, as well as the axial electrode and its conductor, in the mold cavity; and
   f. filling the mold cavity with a plastic material through the process of injection molding to form a part encompassing the attached portions.

* * * * *